(12) United States Patent
Roeygaard et al.

(10) Patent No.: US 12,725,490 B2
(45) Date of Patent: Sep. 1, 2026

(54) LOTTERY TICKET SELLING SYSTEMS AND METHODS

(71) Applicant: Brightstar Global Solutions Corporation, Providence, RI (US)

(72) Inventors: Michael Roeygaard, Rome (IT); Apostolos D. Kallis, Barrington, RI (US); Paul Riley, East Greenwich, RI (US)

(73) Assignee: Brightstar Global Solutions Corporation, Providence, RI (US)

( * ) Notice: Subject to any disclaimer, the term of this patent is extended or adjusted under 35 U.S.C. 154(b) by 334 days.

(21) Appl. No.: 18/170,866

(22) Filed: Feb. 17, 2023

(65) Prior Publication Data

US 2024/0282179 A1 Aug. 22, 2024

(51) Int. Cl.

| | |
|---|---|
| ***G07F 17/42*** | (2006.01) |
| ***G06Q 20/20*** | (2012.01) |
| ***G06Q 30/0283*** | (2023.01) |
| ***G06Q 30/0601*** | (2023.01) |
| ***G07F 17/32*** | (2006.01) |

(52) U.S. Cl.

CPC ........... *G07F 17/42* (2013.01); *G06Q 20/208* (2013.01); *G06Q 20/209* (2013.01); *G06Q 30/0283* (2013.01); *G06Q 30/0633* (2013.01); *G07F 17/329* (2013.01)

(58) Field of Classification Search

CPC ....... G07F 17/42; G07F 17/329; G06Q 20/18; G06Q 20/20

See application file for complete search history.

(56) References Cited

U.S. PATENT DOCUMENTS

| | | | |
|---|---|---|---|
| 3,855,457 | A | 12/1974 | Amundson et al. |
| 5,216,595 | A | 6/1993 | Protheroe |
| 5,222,624 | A | 6/1993 | Burr |
| 5,239,165 | A | 8/1993 | Novak |
| 5,408,417 | A | 4/1995 | Wilder |
| 5,836,498 | A | 11/1998 | Turek |
| 6,267,670 | B1 | 7/2001 | Walker et al. |
| 6,397,193 | B1 | 5/2002 | Walker et al. |
| 6,609,644 | B1 | 8/2003 | Menna |
| 6,712,253 | B2 | 3/2004 | Hargrave et al. |
| 6,714,838 | B2 | 3/2004 | Scrymgeour et al. |
| 6,726,077 | B2 | 4/2004 | Roberts et al. |
| 6,887,153 | B2 | 5/2005 | Walker et al. |
| 6,899,621 | B2 | 5/2005 | Behm et al. |
| 7,032,774 | B2 | 4/2006 | Boehm et al. |
| 7,100,822 | B2 | 9/2006 | Piper et al. |
| 7,383,099 | B2 | 6/2008 | Pollard et al. |
| 7,479,060 | B2 | 1/2009 | Walker et al. |
| 7,547,251 | B2 | 6/2009 | Walker et al. |

(Continued)

OTHER PUBLICATIONS

"Altura Lottery Terminal Retailer Reference Guide", North Carolina Education Lottery, Jul. 2016.

(Continued)

*Primary Examiner* — Robert E Mosser
(74) *Attorney, Agent, or Firm* — Neal, Gerber & Eisenberg LLP

(57) ABSTRACT

A lottery ticket selling system including a point-of-sale system and a lottery ticket vending machine, and methods employing such POS system and lottery ticket vending machine to enable the purchase and dispensing of lottery tickets.

11 Claims, 3 Drawing Sheets

(56) References Cited

U.S. PATENT DOCUMENTS 7,562,798 B2 7/2009 Bartolone et al.
7,577,496 B2 8/2009 Walker et al.
7,627,497 B2 12/2009 Szrek et al.
7,665,394 B2 2/2010 Roberts et al.
7,756,742 B2 7/2010 Gilmore et al.
7,850,257 B2 12/2010 Roberts et al.
8,127,973 B2 3/2012 Mirkovic et al.
8,192,268 B1 6/2012 Karpe
8,210,921 B1 7/2012 Karpe
8,328,618 B2 12/2012 Ekisheva et al.
8,534,524 B2 9/2013 Businger et al.
9,613,337 B1 4/2017 Garrison
9,685,026 B1 6/2017 Garrison
10,078,933 B2 * 9/2018 Clark ...................... G07F 9/002
10,229,466 B2 3/2019 Christensen et al.
10,373,443 B2 8/2019 Ghia
10,403,088 B2 9/2019 Ghia et al.
10,438,452 B2 10/2019 Ferron et al.
10,672,234 B2 * 6/2020 Behm ..................... G07F 17/42
10,769,894 B2 9/2020 Giunti
11,010,987 B2 5/2021 Bucci
11,043,079 B2 6/2021 Sandvick
11,158,172 B2 10/2021 Ghia
2003/0120381 A1 6/2003 Perin et al.
2003/0220132 A1 11/2003 Walker et al.
2004/0000572 A1 1/2004 Engelhardt, Jr. et al.
2005/0178810 A1 8/2005 Woods et al.
2007/0017978 A1 1/2007 Ho
2009/0292600 A1 11/2009 Davis
2010/0057654 A1 3/2010 Otto et al.
2010/0308071 A1 12/2010 Businger
2012/0122556 A1 5/2012 Schrotter et al.
2012/0138688 A1 6/2012 Young
2014/0008407 A1 1/2014 Bucci et al.
2016/0232741 A1 8/2016 Assis et al.
2016/0379287 A1 12/2016 Dabiri
2017/0018048 A1 1/2017 Christensen et al.
2017/0323704 A1 11/2017 Ovalle
2018/0005482 A1 1/2018 Ghia et al.
2019/0073652 A1 3/2019 Garrison
2019/0188947 A1 6/2019 Giunti
2020/0074576 A1 3/2020 Kaiblinger et al.
2021/0065497 A1 3/2021 Bettcher et al.
2021/0104115 A1 * 4/2021 Mahmoodi .......... G06K 7/1434
2021/0264725 A1 8/2021 Gotlieb et al.

OTHER PUBLICATIONS

"Game Touch 20", IGT touch screen lottery vending machine, promotional information available online before the priority date of this patent application.
"Game Touch 28", IGT touch screen lottery vending machine, promotional information available online before the priority date of this patent application.
"StrongPoint Solutions Checkout and Payment", Available online at https://www.strongpoint.com/solutions/checkout-and-payment/vensafe/vensafe-dispenser/, before the priority date of this patent application.
"Lottery Tracking System—LottoShield", www.lottoshield.com, available prior to Sep. 8, 2022.

* cited by examiner

LOTTERY TICKET SELLING SYSTEMS AND METHODS

BACKGROUND

The present disclosure relates to lottery ticket selling systems and methods that enable the purchase of lottery tickets through point-of-sale (POS) systems and the dispensing of such purchased lottery tickets through associated lottery ticket vending machines.

Instant lottery tickets are widely available. Instant lottery tickets may include predetermined win or lose indicia information under one or more covers such as a scratch-off-coating ("SOC"). Millions of instant lottery tickets are produced and sold every year. Instant lottery tickets have substantial variations in the structures, configurations, and arrangements of the individual components of the instant lottery tickets including but not limited to the barcodes for such lottery tickets. These variations occur on a jurisdictional basis and on a manufacturer basis. This wide variety of barcodes for instant lottery tickets limits the types of systems that can be used to sell such instant lottery tickets. For example, various POS systems commercially employed by wholesalers and retailers are not configured to sell instant lottery tickets.

BRIEF SUMMARY

In various embodiments, the present disclosure relates to a lottery ticket selling system including a point-of-sale (POS) system including: a POS system server, a POS system terminal communicatively connected to the POS system server, wherein the POS system terminal is configured to enable a purchase of a lottery ticket, a POS system scanner communicatively connected to the POS system terminal, and a POS system receipt printer communicatively connected to the POS system terminal, wherein the POS system terminal is configured to cause the POS system receipt printer to print a voucher for the lottery ticket; and a lottery ticket vending machine configured to read the voucher and dispense the purchased lottery ticket.

In various other embodiments, the present disclosure relates to a lottery ticket selling system including: a lottery ticket vending machine configured to hold and dispense each of a plurality of different instant lottery tickets; and a POS system including: a POS system terminal configured to enable a purchase of the instant lottery tickets held in the lottery ticket vending machine, and a POS system receipt printer communicatively connected to the POS system terminal, wherein the POS system terminal is configured to cause the POS system receipt printer to print vouchers for the instant lottery tickets.

In various other embodiments, the present disclosure relates to a lottery ticket selling system including: a lottery ticket vending machine configured to hold and dispense each of a plurality of different lottery tickets; and a POS system including: a POS system server, a POS system terminal communicatively connected to the POS system server, wherein the POS system terminal is configured to enable a purchase of a selected lottery ticket after verifying availability of the selected lottery ticket from the lottery ticket vending machine, a POS system scanner communicatively connected to the POS system terminal, and a POS system receipt printer communicatively connected to the POS system terminal, wherein the POS system terminal is configured to cause the POS system receipt printer to print a voucher for the selected lottery ticket.

Additional features are described in, and will be apparent from, the following Detailed Description and the figures.

DETAILED DESCRIPTION

In various embodiments, the present disclosure relates generally to a lottery ticket selling system including a point-of-sale system (referred to herein as a POS system) and a lottery ticket vending machine, and methods employing such POS system and lottery ticket vending machine to enable the sale and dispensing of lottery tickets (such as instant lottery tickets). The systems and methods of the present disclosure substantially expand the quantity of locations that lottery tickets can be purchased.

Instant lottery tickets are employed as example lottery tickets herein; however, the present disclosure is not meant to be limited by such examples. For a better understanding of the present disclosure, an example instant lottery ticket is first described herein.

Figure 1A:
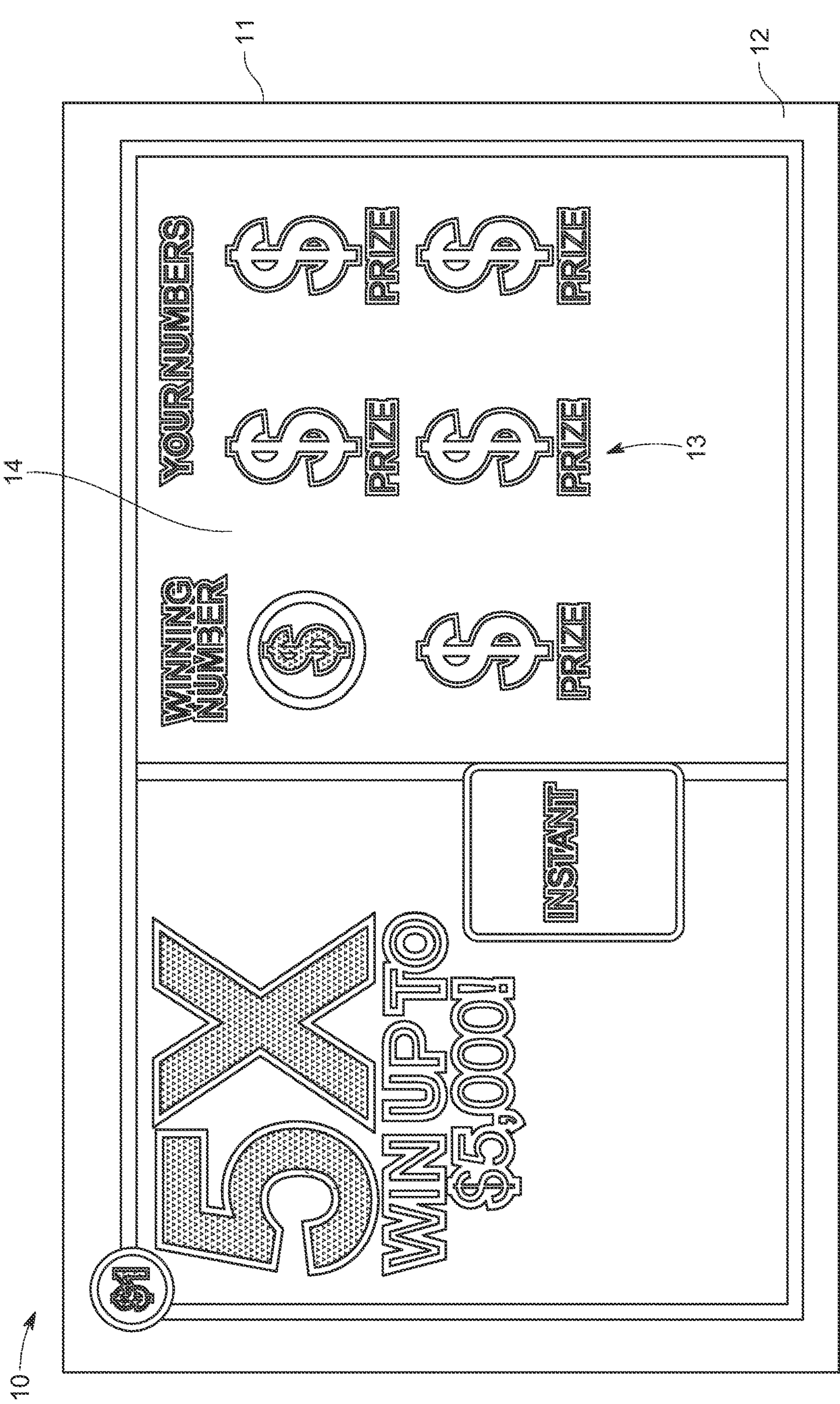
FIG. 1A is front view of an example instant lottery ticket.
Figure 1B:
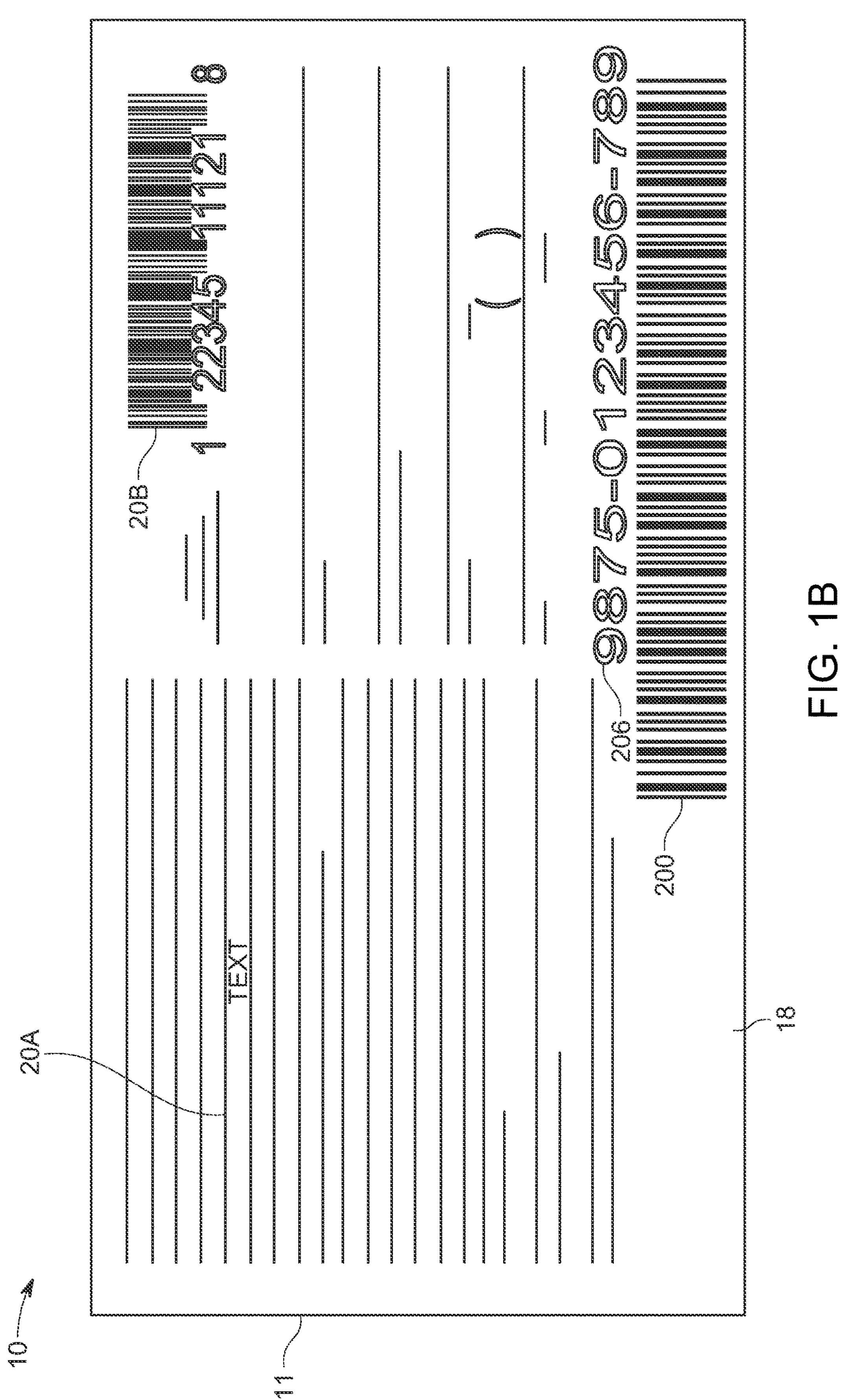
FIG. 1B is rear view of the example instant lottery ticket of FIG. 1A.

Various known instant lottery tickets are single game instant lottery tickets. An example single game instant lottery ticket 10 is shown in FIGS. 1A and 1B and includes: (1) a ticket substrate 11; (2) a front surface 12 of the ticket substrate 11; (3) a predefined scratch-off area 14 defined on the front surface 12; (4) a scratch-off coating ("SOC") (not shown) covering variable lottery game indicia (not shown) printed on the predefined scratch-off area 14; (6) a back surface 18 of the ticket substrate 11; and (7) various different variable instant lottery ticket information indicia 20A, 20B, 20C, and 20D printed on the back surface 18. The instant lottery ticket information indicia can include text, one or more ticket numbers, one or more ticket barcodes, and other instant lottery ticket information that is either or both human readable and machine readable. Certain of the instant lottery ticket information identifies the game, pack, and instant lottery ticket number, and can provide other inventory control data. Various known instant lottery tickets include multiple predefined scratch-off areas, multiple sets of variable lottery game indicia printed on the predefined scratch-off areas, and multiple SOCs covering the variable lottery game indicia sets. At any one time, a lottery system (such as a state lottery agency) can provide up to hundreds of different types of instant lottery games. These instant lottery tickets can be of various different sizes and configurations. These instant lottery tickets are typically either: (1) sold and provided by a lottery ticket seller (such as a lottery ticket retailer); or (2) sold and provided by a dedicated lottery ticket vending machine.

Various known instant lottery tickets include a variable human readable inventory control number, associated machine-readable barcode, and legal text printed on the instant lottery ticket back. The inventory control number can include: (1) a four-digit game identifying number; (2) a seven-digit pack number; (3) a one-digit check number; and (4) a three-digit ticket number, that together uniquely identify this instant lottery ticket from a pack of instant lottery tickets. The instant ticket's barcode can also represent corresponding identical data. All of this data in both machine and human readable formats specifically only provide limited information regarding the instant lottery ticket. The instant ticket inventory control data on the back of the instant lottery ticket are readable prior to purchase of the instant lottery ticket. This readability enables lottery system warehouse storage, picking, shipping, pack activation, purchase, and redemption of such instant lottery ticket. For security reasons, many lotteries have removed win or loss related information from this visible barcode and placed such information under scratch-off material.

The instant lottery ticket's barcode can be scanned by barcode reading devices but unless those devices are connected to a lottery's instant lottery ticket management system, the devices such as those connected to POS systems cannot process and use the information on the lottery ticket itself to enable purchase and/or redemption of such instant lottery tickets. This is in part due to the varying lengths of the inventory, validation, and check digit information, such information being non-uniform and varying from jurisdiction to jurisdiction, which collectively make it very difficult for POS systems to determine how to process and use this data. Additionally, certain lottery tickets have two separate barcodes that are geographically separated on the substrate of the ticket, and which have different barcode formats and encode different data. Even if the POS systems can collect the necessary inventory data from the inventory barcodes, such POS systems are not connected to the lottery central gaming systems, so they are not configured to send such information to lottery systems.

Instant lottery tickets are often arranged during manufacture (which includes after complete printing) in instant lottery ticket packs of a static quantity that often varies by price point for storage, for organization, for sorting, for picking, and for shipping to instant lottery ticket sellers (such as instant lottery ticket retailers). The instant lottery ticket packs often include: (1) a stack of instant lottery tickets (that are all of the same type, same size, and same game(s)); and (2) a transparent secure outer wrapping (such as transparent plastic wrapping) around the stack of instant lottery tickets. Such instant lottery ticket packs are often configured such that the back surface of at least one instant lottery ticket is visible through the transparent pack wrapping. Logistical tracking and activation of such instant lottery tickets are accomplished by the grouping of tickets in these packs. There are several reasons for arranging instant lottery tickets in packs. One reason is that instant lottery tickets can be ordered and shipped in packs with the pack being the fundamental unit of reconciliation. Since instant lottery tickets are shipped in packs, the pack is also the fundamental unit of activation on the overall instant lottery ticket system. In other words, individual instant lottery ticket activation is currently done on the pack level instead of the individual ticket level. When a retailer receives a new pack of instant lottery tickets, the retailer must first activate the pack on the instant lottery ticket system before selling any of the instant lottery tickets in that pack. Pack activation thereby enables instant lottery tickets to be shipped via common carrier since un-activated or stolen instant lottery ticket packs can be flagged on the instant lottery ticket system with any instant lottery ticket in that pack designated as invalid if redemption of that instant lottery ticket is attempted.

All of the packs for a given lottery game are logged in a digital ship file by the instant lottery ticket manufacturer and loaded on the instant lottery ticket system prior to the tickets for that lottery game being placed on sale for purchase. The ship file contains data including a list of all the manufactured packs identifying (typically by omission) any pack numbers that were destroyed in the manufacturing process. The inventory file for a game is transferred from the ticket manufacturer and loaded into a lottery's instant ticket management system. As a lottery game is placed on sale for purchase, the instant ticket system collects data such as: "pack 'X' shipped to retailer 'Y'", and then "pack 'X' was activated", or "pack 'X' was reported as stolen/missing", etc. Thus, the ship file enables logistical tracking of all manufactured packs for an instant lottery ticket game. The ship file does not contain any win or lose data and cannot be linked to a validation file.

The validation file contains the validation codes for all instant lottery tickets for a lottery game. The validation codes provide pointers to the prize values (if any) of the instant lottery tickets on the instant lottery ticket system. The validation codes are inaccessible on un-played instant lottery tickets due to a portion of the code being covered by SOC. In some versions, the validation code is also embodied as a barcode hidden under the SOC such that it cannot be scanned until the instant lottery ticket is scratched to expose the barcode, and in other versions there is some validation file data in addition to the inventory control data in the ticket back barcode in an encrypted format. Therefore, the security of the system is partly derived from the validation file being unassociated with the ship file as well as the physical un-played ticket's inventory control data. Both the ship and validation files are generated by the ticket manufacturer before the tickets are shipped to a lottery. Lottery logistical and validation systems require the ship and validation files to be loaded on the lottery system prior to instant tickets being shipped to retailers and placed on sale for purchase. Once loaded onto the system, the basic validation file typically cannot be altered (other than flagged additions—e.g., redeemed, stolen, etc.) thereby ensuring the integrity of the instant ticket game and its predetermined payout.

As mentioned above, one issue with the above-described instant lottery tickets is that there are substantial variations in the structures, configurations, and arrangements of the individual components thereof such as the barcodes for such instant lottery tickets. These variations most often occur on a jurisdictional basis and can occur on a manufacturer basis. This wide variety of the structures, configurations, and arrangements of these individual components including the barcodes for instant lottery tickets limits the types of systems that can be used to activate lottery ticket packs and that can be used to sell such instant lottery tickets. For example, the above-described example instant lottery ticket packs must be activated by dedicated lottery terminals or lottery vending machines prior to purchase of any of those instant lottery tickets in such instant lottery ticket packs. This limits the locations that such instant lottery tickets can be purchased to the locations that have dedicated lottery terminals or dedicated lottery ticket vending machines.

Also, as mentioned above, the above described structures, configurations, and requirements for such instant lottery tickets prevent such instant lottery tickets from being processed by and thus sold via various POS systems such as retailer POS systems that are used to facilitate the purchase of various products other than lottery tickets. For example, many grocery store POS systems cannot process instant lottery tickets due to the above described issues. Thus, instant lottery tickets typically cannot be purchased at most operator attended or unattended in-lane POS system terminals at wholesale and retail stores.

Various embodiments of the systems and methods of the present disclosure enable such instant lottery tickets to be sold via various POS systems such as operator attended or unattended retailer in-lane POS systems that are used to facilitate the purchase of various products other than lottery tickets.

Figure 2:
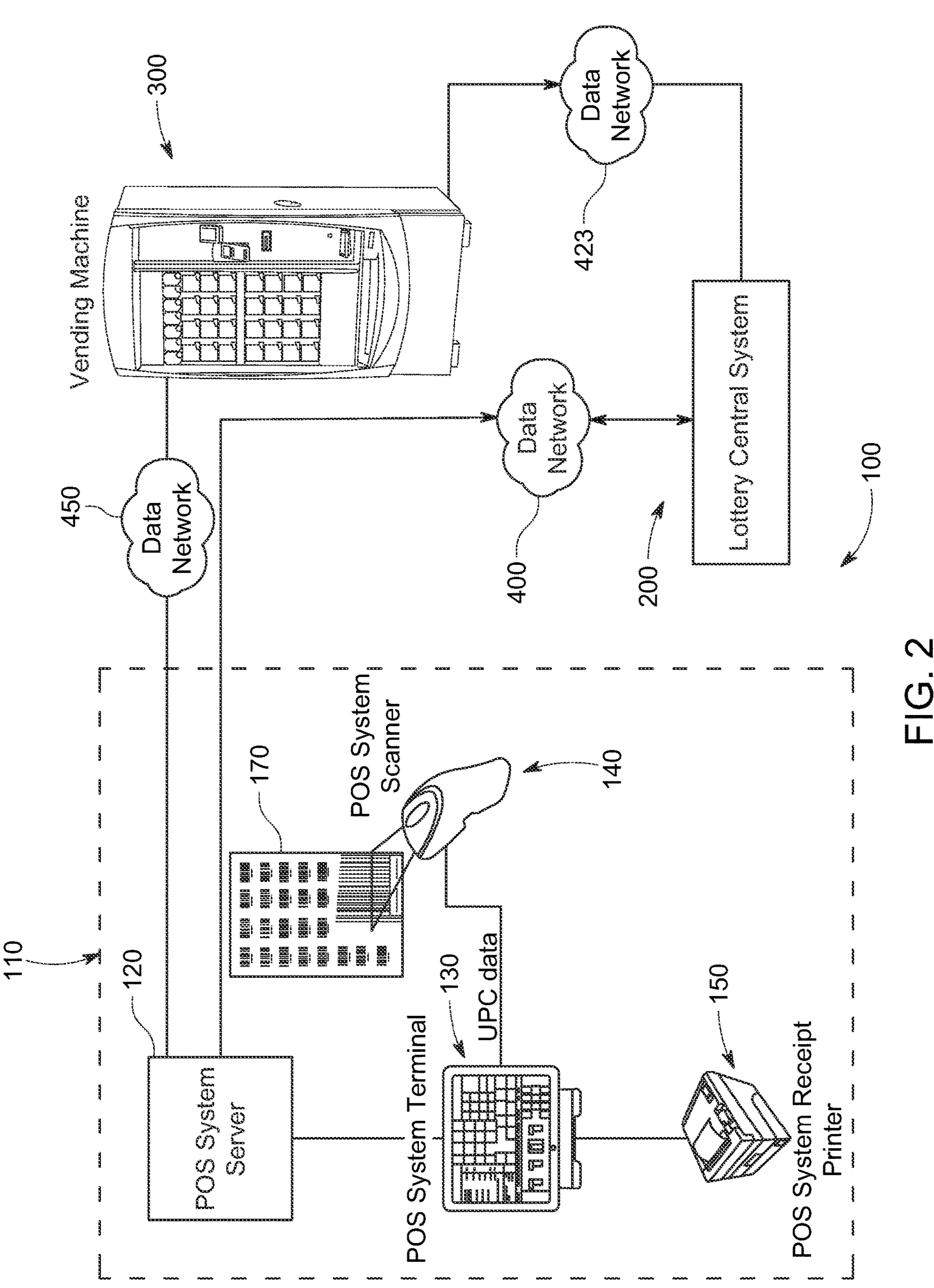
FIG. 2 is a diagrammatic view of a lottery ticket selling system including a POS system and a lottery ticket vending machine of one example embodiment of the present disclosure.

FIG. 2 illustrates a lottery ticket selling system 100 in accordance with one example embodiment of the present disclosure. This example lottery ticket selling system 100 includes a POS system 110, a lottery central system 200, and a lottery ticket vending machine 300 that co-act to enable the purchase and dispensing of one or more lottery tickets (such as but not limited to instant lottery tickets) in accordance with one example embodiment of the present disclosure. However, it should be appreciated that various embodiments of the present disclosure relate to: (1) a lottery ticket selling system itself; (2) a method of operation of a lottery ticket selling system; (3) a POS system; (4) a method of operation of a POS system; (5) a lottery central system; (6) a method of operation of a lottery central system; (7) a lottery ticket vending machine; and/or (8) a method of operation of a lottery ticket vending machine, such all as described herein.

In this illustrated example embodiment, the POS system 110 includes a POS system server 120, a POS system terminal 130 communicatively connected to the POS system server 120, a POS system scanner 140 communicatively connected to the POS system terminal 130, and a POS system receipt printer 150 communicatively connected to the POS system terminal 130. Various of the different functions of the POS system 110 described herein can be performed by POS system server 120 or the POS system terminal 130. Various of the different functions of the POS system 110 described herein can be performed by POS system server 120 co-acting with the POS system terminal 130. Various of the different functions of the POS system 110 described herein can be performed by only one of the POS system server 120 and the POS system terminal 130, and such functions should be inherent from the descriptions of such functions as described herein (such as displaying a message to a customer would be performed by the POS system terminal 130 rather than the POS system server 120).

The POS system server 120 is configured to communicate with a lottery central system 200 via a suitable data network 400. The lottery central system 200 is configured to communicate with the lottery ticket vending machine 300 via a suitable data network 425. The POS system server 120 is configured to communicate with the lottery ticket vending machine 300 via a suitable data network 450. In various embodiments, the POS system server 120 is configured to communicate with the lottery ticket vending machine 300 but not directly with the lottery central system 200. In various other embodiments, the POS system server 120 is configured to communicate with the lottery central system 200 but not directly with the lottery ticket vending machine 300. In various embodiments, the data networks 400, 425, and 450 are all different data networks. In various other embodiments, two or more of the data networks 400, 425, and 450 are the same data networks. In various embodiments, one or more of these networks are secure and/or dedicated data networks.

The POS system 110 and the lottery ticket vending machine 300 are configured to be positioned at a single location such as a retail grocery store. In various embodiments, the lottery ticket vending machine 300 is configured to be positioned adjacent to or relatively near the POS system terminal 130 at the single location such as a retail grocery store. For example, the POS system terminal 130 can be positioned in a check-out lane and the lottery ticket vending machine 300 can be positioned across an aisle from the POS system terminal 130.

For brevity and simplicity, this example embodiment employs one POS system terminal and one lottery ticket vending machine; however, it should be appreciated that various embodiments of the present disclosure include: (a) a plurality of POS system terminals and one lottery ticket vending machine at the single location; (b) one POS system terminal and a plurality of lottery ticket vending machines at the single location; or (c) a plurality of POS system terminals and a plurality of lottery ticket vending machines at the single location.

Generally, the lottery ticket selling system 100 is configured such that a customer can select one of the plurality of different instant lottery tickets that are available to be dispensed by the lottery ticket vending machine 300 and purchase that instant lottery ticket via the POS system terminal 130. The POS system terminal 130 causes the POS system receipt printer 150 to print a voucher for that purchased instant lottery ticket. The customer can then take the voucher and submit the voucher to the lottery ticket vending machine 300. Responsive to receipt and verification of the voucher, the lottery ticket vending machine 300 dispenses the purchased instant lottery ticket to the customer. Thus, the lottery selling system 100 of the present disclosure thus enables the customer to purchase an instant lottery ticket at the POS system terminal 130 and retrieve the purchased instant lottery ticket through the lottery ticket vending machine 300. It should be appreciated that the customer purchase of a single instant lottery ticket is used as an example herein, but that the lottery ticket selling system 100 will enable to purchase multiple instant lottery tickets at the same time. In various embodiments, when a customer purchases multiple instant lottery tickets at the same time, the POS system 110 will provide only one voucher for all of those instant lottery tickets. In various other embodiments, when a customer purchases multiple instant lottery tickets at the same time, the POS system 110 will provide multiple vouchers for those instant lottery tickets.

The following provides various different more specific example methods of operation of the lottery ticket selling system 100 and the components thereof that can accomplish this overall general method.

In a first example embodiment, identification of the various different instant lottery tickets can be provided by a lottery ticket data provider such as a pre-printed instant lottery ticket lottery ticket data sheet 170. The instant lottery ticket data sheet 170 includes identifications of various different available instant lottery tickets (such as the instant lottery ticket game names), the respective purchase prices for each of the different instant lottery tickets identified thereon, and a plurality of different UPC codes for each of the different instant lottery tickets identified thereon. In various embodiments, each different instant lottery ticket and each different price point for such instant lottery ticket has a different UPC code associated therewith. Such instant lottery ticket data sheet 170 can be maintained and displayed close to the POS system terminal 130 or in another suitable location.

For various embodiments of the present disclosure, the term UPC code is meant to refer a code that is associated with the instant lottery ticket (just as a UPC code can be associated with a product that can be purchased). It should be appreciated that for recording retail sales, the two primary barcode formats currently commercially used are UPC and EAN. UPC stands for Universal Product Code (aka: UPC-A)

and EAN stands for European Article Number (aka: EAN-13 or International Article Number). The UPC format is used primarily in the United States and Canada, and the EAN format is primarily used elsewhere around the world. The UPC format is 12 digits and the EAN format is 13 digits. The UPC was the original format for product barcodes in the 1970s. As demand for barcodes in Europe, Asia, and Australia grew, country codes were added to the front of the barcode number increasing the number of digits to 13 digits (which is why the EAN barcode includes one additional digit). The United States and Canada have a country code of zero that is not printed as part of the barcode nor is it entered in U.S. and Canadian POS systems. Thus, a 12-digit UPC code can be converted to a 13-digit EAN by adding the country code of 0 to the beginning of the code. For the purposes of the present disclosure, the term UPC code is meant to includes a code in the UPC format or a code in the EAN format. The UPC code enables the POS system processing the requested purchase of an instant lottery ticket to quickly and easily determine the purchase price of that instant lottery ticket similar to a purchase price lookup for other products. Each different instant lottery ticket will have a different UPC code associated with it. It should be appreciated that the UPC code for an instant lottery ticket can be different then the codes such as any barcodes that are actually on the instant lottery ticket itself. It should further be appreciated that the barcode(s) on the instant lottery ticket is not used for the purchase of that instant lottery ticket because that instant lottery ticket is maintained in the lottery ticket vending machine 300 until dispensed. Rather, the UPC codes on the instant lottery ticket lottery ticket data sheet 170 are used in this first example embodiment.

Returning to this first example embodiment, the POS system 110 can store data regarding the UPC codes for the instant lottery tickets available at the location of the POS system 110. In various embodiments, obtaining this data can be part of an initiation process, part of update processes between the POS system 110 and the lottery central system 200, and/or part of update processes between the POS system 110 and the lottery ticket vending machine 300. These processes can be employed to keep each of these components up to date as to which instant lottery tickets are available via the lottery ticket vending machine 300 at each point in time. Certain examples of such processes are described below.

In operation of the first example embodiment, an operator of the POS system scanner 140 scans the respective UPC barcode of the lottery ticket data sheet 170 that corresponds to an instant lottery ticket that a customer (at the POS system terminal 130) has indicated that the customer wants to purchase. Responsive to receiving from the POS system scanner 140 the data including UPC code for this instant lottery ticket, the POS system terminal 130 uses the UPC code to determine the purchase price of that instant lottery ticket and adds that purchase price to the electronic shopping list or running total amount for the purchases by the customer. After all respective inputs into the POS system terminal 130 of any other lottery tickets and any other products, the POS system terminal 130 displays a total amount for the purchase by the customer and the POS system terminal 130 enables the customer to pay for the total amount of purchases in any suitable manner (such as in a conventional manner or future developed manner). The POS system terminal 130 then causes the POS system receipt printer 150 to print a voucher for the purchased instant lottery ticket that the customer selected. The voucher can be part of the receipt for all of the customer's purchases or can be a separate printed voucher in addition to the receipt. The customer can then take the voucher and submit the voucher to the lottery ticket vending machine 300 such as via a suitable input device (not shown) such as a suitable scanner (not shown) of the lottery ticket vending machine 300. The lottery ticket vending machine 300 uses data obtained from the voucher (such as a one-time use code as explained below) to verify that the voucher is for an instant lottery ticket not already dispensed (e.g., that the voucher has not already been used and that the voucher is otherwise valid), and then dispenses the corresponding purchased instant lottery ticket to the customer. Responsive to the lottery ticket vending machine 300 determining that the voucher is not valid, the lottery ticket vending machine 300 does not dispense any instant lottery ticket to the customer, can display an appropriate error message on the display device (not shown) of the lottery ticket vending machine 300, and can send a suitable error notification message to the POS system 110 and/or the lottery central system 200.

In various such embodiments, when a lottery ticket pack is sold out or removed from the lottery ticket vending machine 300, the lottery ticket data sheet 170 can be changed accordingly. In certain of embodiments, when a lottery ticket pack is added to the lottery ticket vending machine 300, the lottery ticket data sheet 170 can be changed accordingly.

In other embodiments, other methods for providing the UPC codes for such instant lottery tickets can be employed. For example, different separate hangtags associated with the different available instant lottery tickets that each include the lottery ticket name, the purchase price thereof, and the corresponding UPC barcode can be employed. These hangtags can be displayed in the check-out lane adjacent to the POS system terminal 130 or in one or more other suitable locations. In these embodiments, when a lottery ticket pack is sold out or removed from the lottery ticket vending machine 300, the corresponding hangtags can be removed from such display(s). In these embodiments, when a lottery ticket pack is added to the lottery ticket vending machine 300, the corresponding hangtag(s) can be added to such display(s).

In other embodiments, a suitable electronic display device can be employed to provide identifications of various different available instant lottery tickets (such as the instant lottery ticket game names), the corresponding purchase prices for the different instant lottery tickets, and a plurality of different UPC codes for the plurality of different instant lottery tickets. In such embodiments, the electronic display device(s) can be easily updated based on the available instant lottery tickets that can be dispensed from the lottery ticket vending machine 300.

In various embodiments, the lottery ticket vending machine 300 or the lottery central system 200 communicates data (such as a list) relating to the instant lottery tickets that are available via the vending machine 300 to the POS system 110 at various appropriate times. In these embodiments, this data enables, responsive to receiving a UPC code for an instant lottery ticket that a customer wants to purchase, the POS system 110 to verify that the lottery ticket vending machine 300 has a suitable remaining quantity of that customer selected instant lottery ticket before adding that instant lottery ticket to the shopping list or running total. If the POS system 110 is unable to verify that the lottery ticket vending machine 300 has a suitable remaining quantity of that customer selected instant lottery ticket, the lottery system terminal 130 can display a message that indicates that the customer selected instant lottery ticket is not available for purchase. In various such embodiments, the lottery ticket vending machine 300 or the lottery central system 200 can communicate a change in the data regarding the instant lottery tickets that are available via the lottery ticket vending machine 300 to the POS system 110 such as when the lottery ticket vending machine 300 runs out of a certain instant lottery ticket, or when one or more instant lottery ticket packs in the lottery ticket vending machine 300 are changed.

In various other embodiments, responsive to receiving the UPC code for an instant lottery ticket that a customer selects to purchase, the POS system 110 first checks to verify that the lottery ticket vending machine 300 has a suitable remaining quantity of that instant lottery ticket before adding that lottery ticket to the running total. In one such embodiment, the POS system 110 communicates with the lottery ticket vending machine 300 for this verification. In another such embodiment, the POS system 110 communicates with the lottery central system 200 for this verification.

In one such example embodiment, the POS system 110 creates in real time a ticket availability request and transmits in real time the ticket availability request to the lottery ticket vending machine 300. The lottery ticket vending 300 processes the ticket availability request and creates in real time a ticket availability response. The ticket availability response can either include data confirming that the instant lottery ticket is available or is not available via the lottery ticket vending machine 300. The lottery ticket vending machine 300 transmits in real time the ticket availability response to the POS system 110. Responsive to receiving the ticket availability response data, the POS system 110 determines in real time if the instant lottery ticket is available based on that received ticket availability response. If the instant lottery ticket is available, the POS system terminal 130 adds the instant lottery ticket purchase price to the running total amount and the purchase proceeds as indicated above. If the instant lottery ticket is not available, the POS system terminal 130 displays a suitable message such that an operator of the POS system terminal 130 or the POS system terminal 130 itself can indicate to the customer that the customer selected instant lottery ticket is unavailable for purchase. It should be appreciated that the communications from and to the POS system 110 described above can be: (a) with the POS system server 120 that in turn communicates with the lottery ticket vending machine 300, or in alternative embodiments (b) with the POS system terminal 130 that communicates with the lottery ticket vending machine 300. It should be appreciated that in various embodiments, the lottery ticket vending machine 300 maintains up to date data on the instant lottery tickets dispensed and/or held by the lottery ticket vending machine 300 for dispensing.

In another example embodiment, the POS system 110 creates in real time a ticket availability request and transmits in real time the ticket availability request to the lottery central system 200. The lottery central system 200 processes the ticket availability request and creates in real time a ticket availability response. The ticket availability response can either include data confirming that the instant lottery ticket is available or is not available via the lottery ticket vending machine 300. The lottery central system 200 transmits in real time the ticket availability response to the POS system 110. Responsive to receiving the ticket availability response data, the POS system 110 determines in real time if the instant lottery ticket is available based on that received ticket availability response. If the instant lottery ticket is available, the POS system terminal 130 adds the instant lottery ticket purchase price to the running total amount and the purchase proceeds as indicated above. If the instant lottery ticket is not available, the POS system terminal 130 displays a suitable message such that an operator of the POS system terminal 130 or the POS system terminal 130 itself can indicate to the customer that the customer selected instant lottery ticket is unavailable for purchase. It should be appreciated that the communications from and to the POS system 110 described above can be: (a) with the POS system server 120 that in turn communicates with the lottery central system 200, or in alternative embodiments (b) with the POS system terminal 130 that communicates with the lottery central system 200. It should be appreciated that the lottery central system 200 lottery ticket maintains up to date data on the instant lottery tickets dispensed and/or held by the lottery ticket vending machine 300 for dispensing. It should be appreciated that where verification is with the lottery central system 200, the lottery vending machine 300 would regularly communicate with the lottery central system 200 to keep the lottery central system 200 up to date on the instant lottery tickets held by the lottery ticket vending machine 300 for dispensing.

In various embodiments, as indicated above, the voucher can only be used one time and after such use cannot subsequently be used for obtaining any lottery ticket from any lottery ticket vending machine. In various embodiments, the voucher can include a one-time use code that is printed on the voucher by the POS system receipt printer 150.

In various embodiments, after a voucher is used to dispense an instant lottery ticket from the lottery ticket vending machine 300, the lottery ticket vending machine 300 can keep and store the voucher (for subsequent collection).

In various embodiments, after a voucher is used to dispense an instant lottery ticket from the lottery ticket vending machine 300, the lottery ticket vending machine 300 can destroy or otherwise mark the voucher to prevent the voucher from being subsequently used.

In various embodiments, after a voucher is used to dispense an instant lottery ticket from the lottery ticket vending machine 300, the lottery ticket vending machine 300 can communicate such one-time use code or use thereof to the lottery central system 200 and/or to any other lottery ticket vending machines such that such voucher cannot be used to obtain another instant lottery ticket.

In various alternative embodiments, the POS system 110 can provide the voucher to the player in an alternative method. For example, in various embodiments, the voucher can be a device that this rewritable and that can be use multiple times although only used one time for the purchase of any single lottery ticket from any lottery ticket vending machine 300. In another example, in various embodiments, the voucher can be downloaded to a player account such as a player account accessible via a player mobile device (such as player cellular phone). Currently, various POS systems are able to email a receipt to a customer. Such implementations can be employed to email a receipt with a voucher or a separate voucher to a customer email account. In such case, the customer can use their mobile device to display such voucher for scanning (or other input) by the lottery vending machine 300. In various other embodiments, POS system 110 can send the player mobile device the voucher in another format, and the player mobile device can be used to communicate the voucher information to the lottery ticket vending machine 300 such as by as suitable wireless communication method (e.g., Bluetooth, NFC communications, etc.). In these various embodiments, each such electronic voucher can include a one-time use code that can be used only one time for obtaining a lottery ticket from any lottery ticket vending machine 300.

It should be appreciated from the above that the size and quantity of the lottery ticket vending machines at the single location such as a retail grocery store determines the quantity of different instant lottery tickets that can be sold and provided by the lottery ticket selling system 100 at that location. For example, if a single lottery ticket vending machine is at a single location such as a retail grocery store and can hold and can dispense instant lottery tickets from 28 different instant lottery ticket packs, then the lottery ticket selling system 100 at that location can only sell 28 different instant lottery tickets at any one point in time. Likewise, for example, if each of two lottery ticket vending machines are at a single location such as a retail grocery store and can each hold and can dispense instant lottery tickets from 28 different instant lottery ticket packs, then the lottery ticket selling system 100 at that location can sell 56 different instant lottery tickets at any one point in time. It should be appreciated that where there are more than one lottery ticket vending machine at a single location, the lottery ticket selling system 100 can be configured to provide the customer an indication as to which of the lottery ticket vending machines the customer can obtain their purchased instant lottery ticket from. In various such embodiments, the POS system receipt printer 150 can print this information on the voucher.

In various embodiments, the operator of the POS system terminal 130 will have the responsibility of verifying that the customer is of the age necessary to purchase a lottery ticket. Thus, the lottery ticket selling system and method of the present disclosure can provide an advantage in the use of a lottery ticket vending machine 300 wherein the age verification of the customer is done separately from the lottery ticket vending machine 300 and specifically at the POS system terminal 130.

Another one of the advantages of the lottery ticket selling system and method of the present disclosure is that the wholesaler or retailer does not need to keep a supply of all of the different instant lottery tickets at each of the multiple check-out lanes for the POS system terminals in that location. This reduces the quantity of instant lottery tickets that need to be maintained at any one time, reduces substantial logistics (such as handling, shelving, and tracking) of such instant lottery tickets, and reduces the cost associated therewith.

A further one of the advantages of the lottery ticket selling system and method of the present disclosure is a reduction in the concern for theft or shoplifting of instant lottery tickets such as from the areas around the POS system terminals. The lottery system vending machine functions as a secure holder and dispenser for such instant lottery tickets.

A further one of the advantages of the lottery ticket selling system and method of the present disclosure is that payment for the voucher takes place at the POS system terminal, which means payment doesn't have to take place at the lottery ticket vending machine which reduces the need to service any bill acceptor (and associated collection box) in the lottery ticket vending machine, and reduces the cashless payments that the lottery system will need to process and fund. Since the lottery transaction is part of the POS system payment, its cost can be included as part of that payment, which is easier for the consumer and more efficient for the retailer (if they are bearing the costs for accepting cashless payments). Additionally, if the lottery ticket vending machine is alternatively configured to operate with the system of the present disclosure and not separately enable direct purchases through such lottery ticket vending machine, then such lottery ticket vending machine can be configured without such payment mechanisms.

In various embodiments, the instant lottery ticket pack activation and other lottery ticket pack management activities are performed separately from the POS system 110 by the lottery ticket vending machine 300 in a conventional manner. For example, before allowing a customer to purchase any instant lottery tickets from any pack of instant lottery tickets that contains the instant lottery ticket, the system can enable an operator to activate the pack of instant lottery tickets via the lottery ticket vending machine 300. In one such example, the instant lottery vending machine 300 has a pack activation mode and the operator of the lottery ticket vending machine 300 can place the lottery ticket vending machine 300 in this pack activation mode. In this pack activation mode, the operator can scan (using a scanner of the lottery ticket vending machine 300) the I2of5 barcode (that contains Game/Pack/Ticket ID) of one of the instant lottery tickets in a pack. In this pack activation mode, the lottery ticket vending machine 300, responsive to receiving lottery ticket related data (including I2of5 content), decodes the I2of5 content and creates in real time ticket pack activation request data based on the I2of5 content. The lottery ticket vending machine 300 transmits via the data network 425 in real time the ticket pack activation request data to the lottery central system 200. The lottery central system 200 processes the ticket pack activation request data and creates in real time ticket pack activation response data. The lottery central system 200 verifies that this ticket pack activation request data came from the correct receiver of this pack of instant lottery tickets and creates ticket pack activation response data. The ticket pack activation response data can either include a ticket pack activation confirmation or a ticket pack activation denial. The lottery central system 200 transmits in real time (and via the suitable data network) the ticket pack activation response data to the lottery ticket vending machine 300. Responsive to receiving the ticket pack activation response data, the lottery ticket vending machine 300 determines in real time if the ticket pack activation response data includes a ticket pack activation confirmation or a ticket pack activation denial. If the ticket pack activation response data includes a ticket activation denial, the lottery ticket vending machine 300 uses and displays a suitable error code such that an operator can address such error or issue in a suitable manner. If the ticket pack activation response data includes a ticket pack activation confirmation, the lottery ticket vending machine 300 displays via its display device a confirmation to the operator that the ticket pack has been activated. The operator can load the instant lottery tickets in that pack into the lottery ticket vending machine 300 for purchase. This verification process can be performed for each of the different packs of lottery tickets to be provided by the lottery ticket vending machine 300. In this manner, the lottery central system 200 knows what lottery tickets are in the lottery ticket vending machine 300. In various different embodiments, as mentioned above, the lottery ticket vending machine 300 or the lottery central system 200 can convey this for each loaded lottery ticket pack to the POS system 110 and saves this data for subsequent lottery ticket availability verifications by the POS system 110.

In various embodiments, the customer can function as the operator of the POS system terminals 130 of the POS system 110 that are configured for self-check-out by the customer. In various such embodiments, certain of the actions described above that are taken by the operator would be taken by the customer to effectuate the purchase of one or more instant lottery tickets. Such actions can include the scanning actions and the receipt of payment actions (such as via a credit or debit card) as described above. For the reasons explained above, even in a self-check-out-situation, the customer does not receive the instant lottery tickets until they are dispensed by the lottery ticket vending machine 300.

In various embodiments, the lottery ticket vending machine 300 is configured to enable a customer to purchase one or more of the instant lottery tickets directly from the lottery ticket vending machine 300. In various other embodiments, the lottery ticket vending machine 300 is configured to enable a customer to purchase only certain of the instant lottery tickets directly from the lottery ticket vending machine 300 but not allow the purchase of certain other instant lottery tickets directly from the lottery vending machine. In such case, such other instant lottery tickets must be purchased through the POS system 110 as described herein. In various other embodiments, the lottery ticket vending machine 300 requires all purchases of the instant lottery tickets to be via the POS system 100 as described herein.

These various example embodiments of the present disclosure provide a series of advantages that enable lottery tickets such as instant lottery ticket to be purchased via POS systems. In addition to the advantages listed above, the advantages can include but are not limited to: (a) providing checkout lane in a wholesaler facility, a retailer facility, or other facility that enables the POS system therein to be used for the purchase of different types of lottery tickets; (b) using POS system receipt printer to print out vouchers at each POS system terminal for lottery tickets; (c) not requiring substantial changes to how operators use such devices or collect payments from customers; (d) providing such devices with limited required additional training by operators in such facilities to use such devices; (e) maintaining security needs for lottery systems and/or the POS systems; (g) providing for purchase of lottery tickets that are recorded on the POS systems using pre-defined UPC codes (that are in addition to the barcodes on the lottery tickets); and (h) generating POS payment receipts that function as payment confirmations for lottery purchases and vouchers that enabling dispensing of the lottery tickets.

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The claims are as follows:

1. A lottery ticket selling system comprising:

a lottery ticket vending machine comprising a payment mechanism, a scanner, and a plurality of ticket drawers configured to hold a plurality of different lottery tickets, each different lottery ticket including a different barcode that identifies that lottery ticket, the lottery ticket vending machine configured to:

communicate via a data network with a lottery central system, communicate data to the lottery central system relating to each of the different lottery tickets that are available for purchase via the lottery ticket vending machine, enable purchase via the payment mechanism of each of the different lottery tickets directly via the lottery ticket vending machine, and communicate data to the lottery central system regarding each of the different lottery tickets dispensed by the lottery ticket vending machine and purchased directly via the payment mechanism of the lottery ticket vending machine; and a point-of-sale (POS) system comprising:

a POS system server, a POS system terminal communicatively connected to the POS system server, a POS system scanner communicatively connected to the POS system terminal, and a POS system receipt printer communicatively connected to the POS system terminal, wherein:

the POS system scanner is configured to scan a lottery ticket data provider to obtain a UPC code for a first lottery ticket of the different lottery tickets held in the lottery ticket vending machine, wherein the UPC code for the first lottery ticket is different than the barcode of the first lottery ticket, the POS system is configured to create a ticket availability request for the first lottery ticket based on the UPC code, the POS system is configured to transmit the ticket availability request for the first lottery ticket to the lottery central system, the POS system is not configured to communicate with the lottery ticket vending machine, and the lottery ticket vending machine is not configured to communicate with the POS system, the POS system is configured to receive a ticket availability response for the first lottery ticket from the lottery central system, and determine that the first lottery ticket is available from the lottery ticket vending machine based on the ticket availability response, the POS system is configured to determine a purchase price for the first lottery ticket, the POS system is configured to determine a one-time use code for the first lottery ticket, and the POS system is configured to cause the POS system receipt printer to print a voucher with the one-time use code for the first lottery ticket, wherein the voucher is readable by the scanner of the lottery ticket vending machine to cause the lottery ticket vending machine to dispense the first lottery ticket, wherein the lottery ticket vending machine is further configured to:

communicate data to the lottery central system regarding first lottery ticket dispensed by the lottery ticket vending machine and sold via the POS system.

2. The lottery ticket selling system of claim 1, wherein the plurality of different lottery tickets is an are instant lottery tickets.

3. The lottery ticket selling system of claim 1, wherein one of the POS system server and the POS system terminal is configured to determine the purchase price of the first lottery ticket based on the UPC code and add that purchase price to an electronic shopping list.

4. The lottery ticket selling system of claim 3, wherein the POS system is configured to display a total amount for purchase of products and the purchase of the first lottery ticket and enable payment for the total amount before causing the POS system receipt printer to print the voucher.

5. The lottery ticket selling system of claim 3, wherein the voucher is part of a printed receipt for the products.

6. The lottery ticket selling system of claim 1, wherein the POS system terminal is configured to display an indication if a another one of lottery tickets is not available from the lottery ticket vending machine.

7. A lottery ticket selling system comprising:

a lottery ticket vending machine comprising a payment mechanism, a scanner, and a plurality of ticket drawers configured to hold and dispense each of a plurality of different instant lottery tickets for different instant lottery games, each different instant lottery ticket including a different barcode that identifies that instant lottery ticket, the lottery ticket vending machine configured to:

communicate via a data network with a lottery central system, communicate data to the lottery central system relating to each of the different lottery tickets that are available for purchase via the lottery ticket vending machine, enable purchase via the payment mechanism of each of the different lottery tickets directly via the lottery ticket vending machine, and communicate data to the lottery central system regarding each of the different lottery tickets dispensed by the lottery ticket vending machine and purchased directly via the payment mechanism of the lottery ticket vending machine; and a point-of-sale (POS) system comprising:

a POS system server, a POS system scanner, a POS system terminal communicatively connected to the POS system server and the POS system scanner, and a POS system receipt printer communicatively connected to the POS system terminal, wherein:

the POS system is not configured to communicate with the lottery ticket vending machine, and the lottery ticket vending machine is not configured to communicate with the POS system, the POS system scanner is configured to scan an instant lottery ticket data provider to obtain a UPC code for a first instant lottery ticket of the instant lottery tickets held in the lottery ticket vending machine, wherein the UPC code for the first instant lottery ticket is different than the barcode of the first instant lottery ticket, the POS system is configured to determine the availability for the first instant lottery ticket based on the UPC code and instant lottery ticket availability data received from the lottery central system, the POS system is configured to determine a purchase price for the instant lottery ticket, the POS system is configured to determine a one-time use code for the first instant lottery ticket, and the POS system is configured to cause the POS system receipt printer to print a voucher with the one-time use code for the first instant lottery ticket, wherein the voucher is readable by the scanner of the lottery ticket vending machine to cause the lottery ticket vending machine to dispense the first instant lottery ticket.

8. The lottery ticket selling system of claim 7, wherein the POS system terminal is configured to enable selection of each instant lottery ticket held in the lottery ticket vending machine at the POS system terminal.

9. The lottery ticket selling system of claim 7, wherein the POS system terminal is configured to enable payment of the purchase price for each instant lottery ticket at the POS system terminal.

10. The lottery ticket selling system of claim 7, wherein the voucher is independent of a printed receipt for any other purchased products.

11. A lottery ticket selling system comprising:

a lottery ticket vending machine comprising a payment mechanism, a scanner, and a plurality of ticket drawers configured to hold and dispense each of a plurality of different lottery tickets for different lottery games, each different lottery ticket including a different barcode that identifies that lottery ticket, the lottery ticket vending machine configured to:

communicate via a data network with a lottery central system, communicate data to the lottery central system relating to each of the different lottery tickets that are available for purchase via the lottery ticket vending machine, enable purchase via the payment mechanism of each of the different lottery tickets directly via the lottery ticket vending machine, and communicate data to the lottery central system regarding each of the different lottery tickets dispensed by the lottery ticket vending machine and purchased directly via the payment mechanism of the lottery ticket vending machine; and a point-of-sale (POS) system comprising:

a POS system server, a POS system terminal communicatively connected to the POS system server, a POS system scanner communicatively connected to the POS system terminal, and a POS system receipt printer communicatively connected to the POS system terminal, wherein:

the POS system is not configured to communicate with the lottery ticket vending machine, and the lottery ticket vending machine is not configured to communicate with the POS system, the POS system is configured to receive a request for a first lottery ticket of the lottery tickets held in the lottery ticket vending machine based on a UPC code for the first lottery ticket, the UPC code being different than the barcode of the first lottery ticket, the POS system is configured to verify availability of the first lottery ticket from the lottery ticket vending machine by transmitting a ticket availability request to a lottery central system and by receiving a ticket availability response, the POS system is configured to determine a purchase price for the first lottery ticket if the first lottery ticket is available from the lottery ticket vending machine, the POS system is configured to display an unavailable ticket indication if the first lottery ticket is not available from the lottery ticket vending machine, and the POS system is configured to cause the POS system receipt printer to print a voucher for the first lottery ticket, wherein the voucher is readable by the scanner of the lottery ticket vending machine to cause the lottery ticket vending machine to dispense the first lottery ticket.

* * * * *